United States Patent
Kelty et al.

(10) Patent No.: US 8,463,481 B2
(45) Date of Patent: *Jun. 11, 2013

(54) DUAL MODE RANGE EXTENDED ELECTRIC VEHICLE

(71) Applicant: Tesla Motors, Inc., Palo Alto, CA (US)

(72) Inventors: Kurt Russell Kelty, Palo Alto, CA (US); Scott Ira Kohn, Redwood City, CA (US); Weston Arthur Hermann, Palo Alto, CA (US); Jeffrey Brian Straubel, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,941

(22) Filed: Nov. 13, 2012

(65) Prior Publication Data

US 2013/0066506 A1  Mar. 14, 2013

Related U.S. Application Data

(63) Continuation of application No. 12/679,807, filed as application No. PCT/US2008/077842 on Sep. 26, 2008, now Pat. No. 8,346,419.

(60) Provisional application No. 60/975,474, filed on Sep. 26, 2007, provisional application No. 60/975,491, filed on Sep. 26, 2007.

(51) Int. Cl.
*B60L 11/00* (2006.01)

(52) U.S. Cl.
USPC ............. 701/22; 324/426; 320/101; 320/104; 320/128; 320/132; 320/137; 318/66; 315/86; 429/23; 477/2; 257/296

(58) Field of Classification Search
USPC ................ 701/22; 324/426; 320/101, 104, 320/128, 132, 137; 318/66; 315/86; 429/23; 477/2; 257/296
See application file for complete search history.

(56) References Cited

U.S. PATENT DOCUMENTS

| | | |
|---|---|---|
| 5,566,774 A | 10/1996 | Yoshida |
| 6,008,626 A | 12/1999 | Sato et al. |
| 6,700,213 B1 | 3/2004 | Wakashiro et al. |
| 6,836,027 B2 | 12/2004 | Lee |
| 2002/0062183 A1* | 5/2002 | Yamaguchi et al. ............ 701/22 |
| 2002/0196026 A1* | 12/2002 | Kimura et al. ................ 324/426 |
| 2003/0111682 A1* | 6/2003 | Tanaka et al. ................. 257/296 |
| 2003/0184256 A1* | 10/2003 | Kopf et al. .................... 320/101 |
| 2005/0082992 A1* | 4/2005 | Aizawa et al. ................. 318/66 |
| 2005/0083017 A1* | 4/2005 | Suzuki .......................... 320/128 |
| 2005/0088148 A1* | 4/2005 | Kubo et al. ................... 320/137 |

(Continued)

*Primary Examiner* — James Trammell
*Assistant Examiner* — Sanjeev Malhotra
(74) *Attorney, Agent, or Firm* — Patent Law Office of David G. Beck (57) ABSTRACT

A dual mode battery charging system and method of use are provided for use in an electric vehicle. The system utilizes at least two user selectable, charging operational modes. In a first operational mode, a state of charge circuit powers on the engine/generator system whenever the battery state of charge falls below a first level and until the battery state of charge reaches a second level, where the second level is higher than the first level. In a second operational mode, the state of charge circuit powers on the engine/generator system whenever the battery state of charge falls below a third level and until the battery state of charge reaches the second level, where the third level is lower than both the first and second levels.

16 Claims, 6 Drawing Sheets

U.S. PATENT DOCUMENTS

| | | | |
|---|---|---|---|
| 2005/0093457 A1* | 5/2005 | Hamblin | 315/86 |
| 2006/0029845 A1* | 2/2006 | Konoto et al. | 429/23 |
| 2006/0029846 A1* | 2/2006 | Konoto et al. | 429/23 |
| 2006/0132094 A1 | 6/2006 | Koo | |
| 2006/0199695 A1* | 9/2006 | Miller et al. | 477/2 |
| 2008/0007224 A1* | 1/2008 | Melichar | 320/132 |
| 2009/0062967 A1 | 3/2009 | Kressner et al. | |
| 2010/0039065 A1* | 2/2010 | Kinkade, Jr. | 320/104 |

* cited by examiner

DUAL MODE RANGE EXTENDED ELECTRIC VEHICLE

CROSS-REFERENCE TO RELATED APPLICATION

This patent application is a continuation of U.S. patent application Ser. No. 12/679,807, filed 8 Apr. 2010, which is a U.S. National Stage Filing under 35 U.S.C. 371 of International Patent Application Serial No. PCT/US2008/077842, filed 26 Sep. 2008 and published as WO 2009/042857, which claims the benefit of U.S. Provisional Application Ser. No. 60/975,474, filed 26 Sep. 2007 and U.S. Provisional Application Ser. No. 60/975,491, filed 26 Sep. 2007, the disclosures of which are incorporated herein by reference for any and all purposes.

BACKGROUND OF THE INVENTION

There are a number of negative aspects to burning fuel in an internal combustion engine to provide for transportation, such as cost, pollution, and the unnecessary depletion of natural resources. Vehicles having electric or partially electric propulsion machinery address some of these problems, but users seek more flexibility in how they use them.

SUMMARY OF THE INVENTION

A vehicle system is provided that includes (i) a propulsion motor, (ii) a battery coupled to the motor and providing energy to the motor, (iii) a generator system for providing charging energy to the battery and comprised of an engine, (iv) an engine control circuit that powers on the engine when it receives an engine control signal, (v) a state of charge circuit that monitors the battery state of charge and is programmed to provide the engine control signal to the engine control circuit in accordance with an operational mode, and (vi) a user interface coupled to the state of charge circuit and configured to receive a user command selecting the operational mode from at least a first operational mode and a second operational mode. In the first operational mode the state of charge circuit provides the engine control signal, thus powering on the engine/generator, when the battery state of charge falls below a first state of charge (e.g., approximately 50% of the full state of charge) and until the battery state of charge reaches a second state of charge (e.g., approximately 70% of the full state of charge), where the second state of charge is higher than the first state of charge. In the second operational mode the state of charge circuit provides the engine control signal, thus powering on the engine/generator, when the battery state of charge falls below a third state of charge (e.g., approximately 10% or 20% of the full state of charge) and until the battery state of charge reaches the second state of charge. In the second operational mode after the third state of charge has been reached once, the system may be configured to provide the engine control signal when the battery state of charge falls below the first state of charge and until the battery state of charge reaches the second state of charge, where the second state of charge is higher than the first state of charge, and where the third state of charge is lower than both the first state of charge and the second state of charge. The average of the first and second states of charge may be preset at a level of at least 68% of the full state of charge. The average of the first and second states of charge may be preset at a level of at least 50% of the full state of charge. The average of the third and fourth states of charge may be preset at a level of at least 20% of the full state of charge. The user interface may be comprised of a touch screen and the user command may be received via a touch registered on the touch screen. The system may include at least one operational mode indicator, such as a light or a message on the touch screen, which may be used to indicate the selected operational mode. The generator of the generator system may be integrated into, or mechanically coupled to, the engine.

In another aspect, a method of controlling battery charging is provided, where the battery provides energy to a motor that, in turn, provides propulsive power to a vehicle. The method includes the steps of (i) providing a user interface, (ii) configuring an operational mode of an on-board generator system in response to a user selection input via the user interface, where the operational mode is selected from at least a first operational mode and a second operational mode, (iii) monitoring a current battery state of charge, and (iv) charging the battery using an on-board generator system in accordance with the selected operational mode. In the first operational mode the method includes the steps of powering on the engine of the on-board generator system when the current battery state of charge falls below a first state of charge and powering off the engine of the on-board generator system when the current battery state of charge reaches a second state of charge, where the second state of charge is higher than the first state of charge. In the second operational mode the method includes the steps of powering on the engine of the on-board generator system when the current battery state of charge falls below a third state of charge and powering off the engine of the on-board generator system when the current battery state of charge reaches the second state of charge. In the second operational mode after the third state of charge has been reached once the method may include the steps of powering on the engine of the on-board generator system when the current battery state of charge falls below the first state of charge and powering off the engine of the on-board generator system when the current battery state of charge reaches the second state of charge, where the second state of charge is higher than the first state of charge, and where the third state of charge is lower than both the first state of charge and the second state of charge.

A further understanding of the nature and advantages of the present invention may be realized by reference to the remaining portions of the specification and the drawings.

DESCRIPTION OF THE SPECIFIC EMBODIMENTS

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
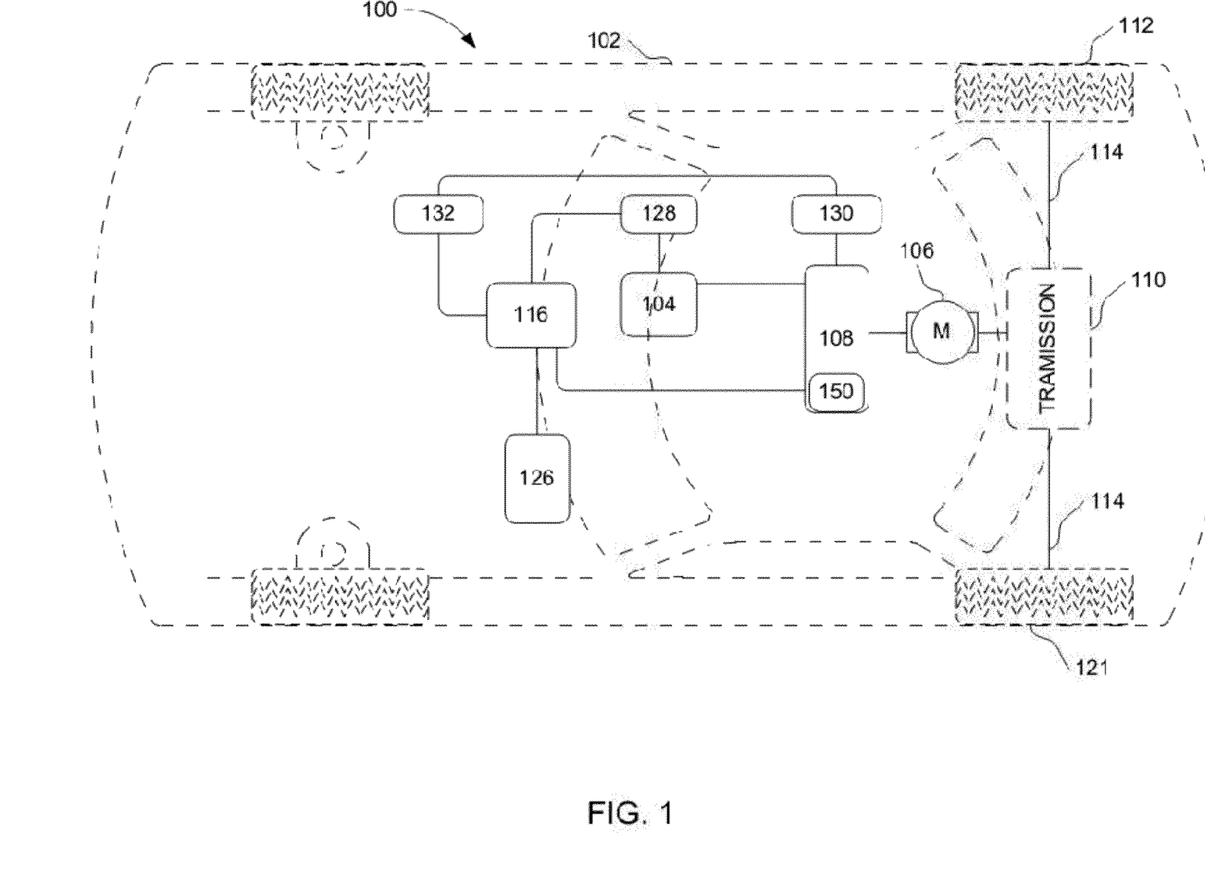
FIG. 1 is a high level diagram of a vehicle, according to some embodiments.

FIG. 1 is a high level diagram of a vehicle 100, according to some embodiments. Vehicles include, but are not limit to, ground based vehicles, aquatic vehicles, and aircraft. For the purposes of explanation, the present subject matter focuses on ground based vehicles. In particular, the present subject matter includes examples outfitted to ground vehicles having hybrid architecture.

Various batteries are contemplated. The present subject matter includes embodiments in which the battery 104 is a battery that is chargeable using electricity rather than chemicals or other materials. Various battery chemistries are contemplated, including lithium ion battery chemistries, lithium iron phosphate battery chemistries, nickel metal hydride chemistries, lead acid chemistries, and other chemistries.

The present subject matter provides systems and methods to charge a battery while reducing operation of an on-board fuel burning engine to charge the battery. For example, using the disclosed technology, it is possible to drive a vehicle using only battery power a farther distance.

FIG. 1 shows a vehicle system 100, according to some embodiments of the present subject matter. In various embodiments, the vehicle 102 is an electric vehicle and includes a vehicle propulsion battery 104 and at least one propulsion motor 106 for converting battery energy into mechanical motion, such as rotary motion. The present subject matter includes examples in which the vehicle propulsion battery 104 is a subcomponent of an energy storage system ("ESS"). An ESS includes various components associated with transmitting energy to and from the vehicle propulsion battery 104 in various examples, including safety components, cooling components, heating components, rectifiers, etc. The inventors have contemplated several examples of ESSs and the present subject matter should not be construed to be limited to the configurations disclosed herein, as other configurations of a vehicle propulsion battery 104 and ancillary components are possible.

The battery includes one or more lithium ion cells in various examples. In some examples, the battery 104 includes a plurality of lithium ion cells coupled in parallel and/or series. Some examples include cylindrical lithium ion cells. In certain examples, the battery 104 includes one or more cells compatible with the 18650 battery standard, but the present subject matter is not so limited. Some examples include a first plurality of cells connected in parallel to define a first brick of cells, with a second plurality of cells connected in parallel to define a second brick of cells, with the first brick and the second brick connected in series. Some examples connect 69 cells in parallel to define a brick. Battery voltage, and as such, brick voltage, often ranges from around 3.6 volts to about 4.2 volts in use. In part because the voltage of batteries ranges from cell to cell, some instances include voltage management systems to maintain a steady voltage. Some embodiments connect 9 bricks in series to define a sheet. Such a sheet has around 35 volts. Some instances connect 11 sheets in series to define the battery of the ESS. The ESS will demonstrate around 385 volts in various examples. As such, some examples include approximately 6,831 cells which are interconnected.

A state of charge circuit 128 is pictured to monitor the state of charge of the battery 104. The state of charge circuit can count coulombs, watt-hours, or provide other measure of how much energy is in the battery 104. In some embodiments, the state of charge is determined by measuring the battery voltage either open circuited or driving a known load. In additional embodiments, the state of charge circuit could optionally provide additional battery information, such as temperature, rate of energy use, number of charge/discharge cycles, and other information relating to battery state. The state of charge circuit 128 can be integrated into an ESS.

Additionally illustrated is an energy converter 108. The energy converter 108 is part of a system which converts energy from the vehicle propulsion battery 104 into energy useable by the at least one propulsion motor 106. In certain instances, the energy flow is from the at least one propulsion motor 106 to the vehicle propulsion battery 104. As such, in some examples, the vehicle propulsion battery 104 transmits energy to the energy converter 108, which converts the energy into energy usable by the at least one propulsion motor 106 to propel the electric vehicle. In additional examples, the at least one propulsion motor 106 generates energy that is transmitted to the energy converter 108. In these examples, the energy converter 108 converts the energy into energy which can be stored in the vehicle propulsion battery 104. This is managed by a state of charge circuit, as disclosed in FIG. 2. In certain examples, the energy converter 108 includes transistors.

Some examples of the energy converter 108 include one or more field effect transistors. Some examples include metal oxide semiconductor field effect transistors. Some examples include one more insulated gate bipolar transistors. As such, in various examples, the energy converter 108 includes a switch bank which is configured to receive a direct current ("DC") power signal from the vehicle propulsion battery 104 and to output a three-phase alternating current ("AC") signal to power the vehicle propulsion motor 106. In some examples, the energy converter 108 is configured to convert a three phase signal from the vehicle propulsion motor 106 to DC power to be stored in the vehicle propulsion battery 104. Some examples of the energy converter 108 convert energy from the vehicle propulsion battery 104 into energy usable by electrical loads other than the vehicle propulsion motor 106. Some of these examples switch energy from approximately 390 Volts DC to 14 Volts DC.

The propulsion motor 106 is, in some embodiments, a three phase alternating current ("AC") propulsion motor, in various examples. Some examples include a plurality of such motors. The present subject matter can optionally include a transmission or gearbox 110 in certain examples. While some examples include a 1-speed transmission, other examples are contemplated. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission 110 to wheels 112 via one or more axles 114, in various examples.

A fuel burning engine 130 is pictured. The fuel burning engine can burn any of a variety of fuels, such as fossil fuels, synthetics and biofuels. The fuel burning engine 130 can be controlled to provide a continuous level of power, or can provide a variable level of power via control such as throttle control, as is known. Some embodiments operate the fuel burning engine 130 at a level which provides for the highest fuel efficiency.

The fuel burning engine 130 is shown connected to the energy converter 108, such that the fuel burning engine 130 could turn a generator to which it is coupled and provide power to the energy converter 108, but other configurations are possible. For example, in some embodiments, an integrated engine generator 130 provides power directly to the vehicle propulsion battery 104.

The engine can run constantly, but various examples turn the engine on or off based on energy requirements of the vehicle 102. Control systems and methods to power the engine on and off are described herein, such in the portions of the disclosure provided to explain FIG. 2. An engine controller circuit 132 is shown which can control whether the engine is powered on or off. The engine controller can also control other aspects of the engine, such as air-to-fuel mixture and other engine values.

A vehicle management system 116 is optionally provided which provides control for one or more of the vehicle propulsion battery 104 and the energy converter 108. In certain examples, the vehicle management system 116 is coupled to vehicle system which monitors a safety system such as a crash sensor. In some examples the vehicle management system 116 is coupled to one or more driver inputs, such as acceleration inputs. The vehicle management system 116 is configured to control power to one or more of the vehicle propulsion battery 104 and the energy converter 108, in various embodiments. The vehicle management system can also communicate information relating to the engine 130 via sending a signal to the engine controller 132. The vehicle management system 116 can also communicate information relating to battery state of charge with the state of charge circuit 128. The diagram shows that the engine controller circuit 132 and the state of charge circuit 128 are separate from the vehicle management system 116, but this depiction is limiting only in function, and those components can be part of the same computer system in some embodiments.

External power 118 is provided to communicate energy with the vehicle propulsion battery 104, in various examples. In various embodiments, external power 118 includes a charging station that is coupled to a municipal power grid. In certain examples, the charging station converts power from a 110V AC power source into power storable by the vehicle propulsion battery 104. In additional examples, the charging station converts power from a 120V AC power source into power storable by the vehicle propulsion battery 104. Some embodiments include converting energy from the battery 104 into power usable by a municipal grid. The present subject matter is not limited to examples in which a converter for converting energy from an external source to energy usable by the vehicle 100 is located outside the vehicle 100, and other examples are contemplated.

Some examples include a vehicle display system 126. The vehicle display system 126 includes a visual indicator of system 100 information in some examples. In some embodiments, the vehicle display system 126 includes a monitor that includes information related to system 100. As such, the vehicle display system 126 can include information relating to vehicle state of charge, and whether the engine 130 is powered on or off.

Figure 2:
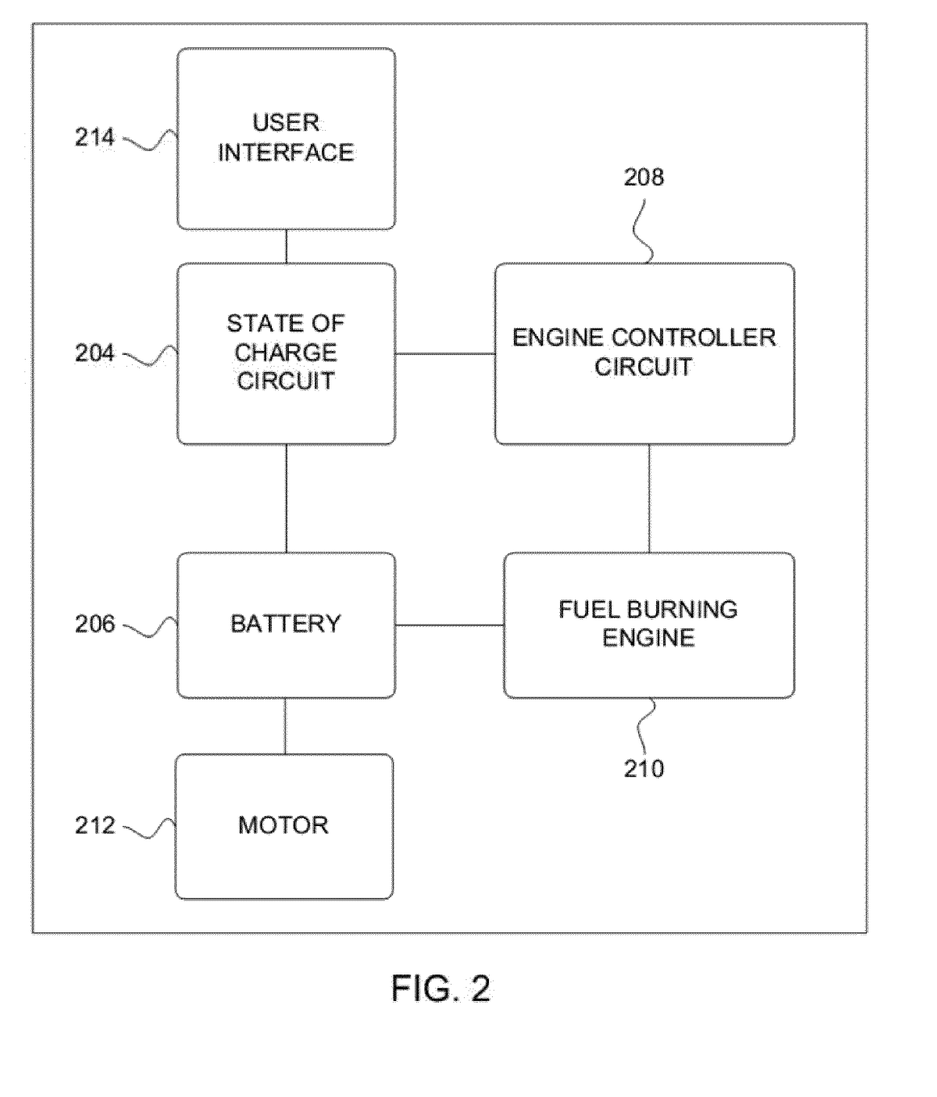
FIG. 2 is a block diagram of an electrical vehicle charging system, according to some embodiments.

FIG. 2 is a block diagram of an electrical vehicle charging system 202, according to some embodiments. Various embodiments include a battery 206. Also included is a fuel burning engine 210 that is coupled to the battery to charge the battery, such as by turning a generator. The system includes a motor 212 of an electric vehicle, the motor 212 coupled to the electric vehicle to propel the electric vehicle, the battery coupled to the motor 212 to power the motor 212. The system also includes a state of charge circuit 204 to monitor a battery state of charge.

A state of charge circuit 204 is preprogrammed to operate according to a selected one of a plurality of operational modes. In some of these modes, the state of charge circuit 204 is to calculate an averaged value over a time period. An averaged value can include a statistical function such as an average or another statistical function.

One embodiment includes at least two operational modes. In the first operational mode, the state of charge circuit 204 is to provide the engine control signal when the battery state of charge is below a first state of charge and until the averaged value increases to a first preprogrammed value. In the second operational mode, the state of charge circuit is to 204 to provide the engine control signal when the state of charge reaches a second state of charge, lower than the first state of charge, and to provide the engine control signal until the averaged value increases to a second preprogrammed value other than the first preprogrammed value. These embodiments can optionally include a third operational mode to provide the engine control signal when the battery state of charge is below a third state of charge and until a user selected battery state of charge is reached. In some embodiments the first state of charge is approximately 70% of a full battery state of charge, the second state of charge is approximately 50% of the full battery state of charge, and the third state of charge is approximately 20% of the full battery state of charge, although other percentages are possible.

In another embodiment, two operational modes are contemplated. In the first operational mode, the state of charge 204 circuit is to provide the engine control signal when the battery state of charge is below a first state of charge and until the battery state of charge reaches a second state of charge. In the second operational mode, the state of charge circuit is to provide the engine control signal when the state of charge is below a third state of charge lower than the first state of charge and the second state of charge and until the battery state of charge reaches a fourth state of charge that is higher than the third state of charge and lower than the first state of charge and the second state of charge.

In some optional configurations of this embodiment, in the second operational mode, after the third state of charge has been reached once, the state of charge circuit 204 provides the engine control signal when the battery state of charge drops below a fifth state of charge that is between the third and fourth states of charge. In some instances, a difference between the third state of charge and the fifth state of charge is greater than a difference between the third state of charge and the fourth state of charge. In some instances, the difference between the third state of charge and the fifth state of charge is twice as great as the difference between the third state of charge and the fourth state of charge. In some configurations, a difference between the third state of charge and the fifth state of charge is less than a difference between the third state of charge and the fourth state of charge. In some instances, the third state of charge is approximately 10%, the fourth state of charge is approximately 23%, the fifth state of charge is approximately 17%.

In further optional configurations of the prior embodiment, the state of charge circuit 204 is to calculate an averaged value over a time period and is preprogrammed to begin the time period after the engine control signal is provided and a preprogrammed battery state of charge is reached. In some instances, the difference between the third state of charge and the averaged value is greater than the difference between the fifth state of charge and the averaged value.

Also included is an engine control circuit 208 to power on the fuel burning engine and to power off the fuel burning engine based on the engine control signal. The engine controller circuit 208 can additionally control how the engine functions. The system is capable of operation in various modes.

In various embodiments, a user interface 214 is coupled to the state of charge circuit 204 to receive a user command to select between at least the first operational mode and the second operational mode such that the state of charge circuit 204 operates in one of the first operational mode and the second operational mode. A user interface 214 can include a switch, such as a toggle switch or a key switch, in some embodiment. In additional embodiments, the user interface 214 is a screen that can take inputs. Inputs to a screen could be via the screen, such as through touch, or through other means, such as by radio control. The user interface 214 could include a light which indicates which mode it is in. In some embodiments, each of the modes is indicated by an illuminated message, either on a screen or otherwise, which labels modes.

HARDWARE AND OPERATING ENVIRONMENT

This section provides an overview of example hardware and the operating environments in conjunction with which embodiments of the inventive subject matter can be implemented. The subject matter of associated with FIG. 3 can be used to implement additional subject matter set out herein. For example, the subject matter of FIG. 3 can be used to implement the state of charge circuit associated with FIG. 2.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
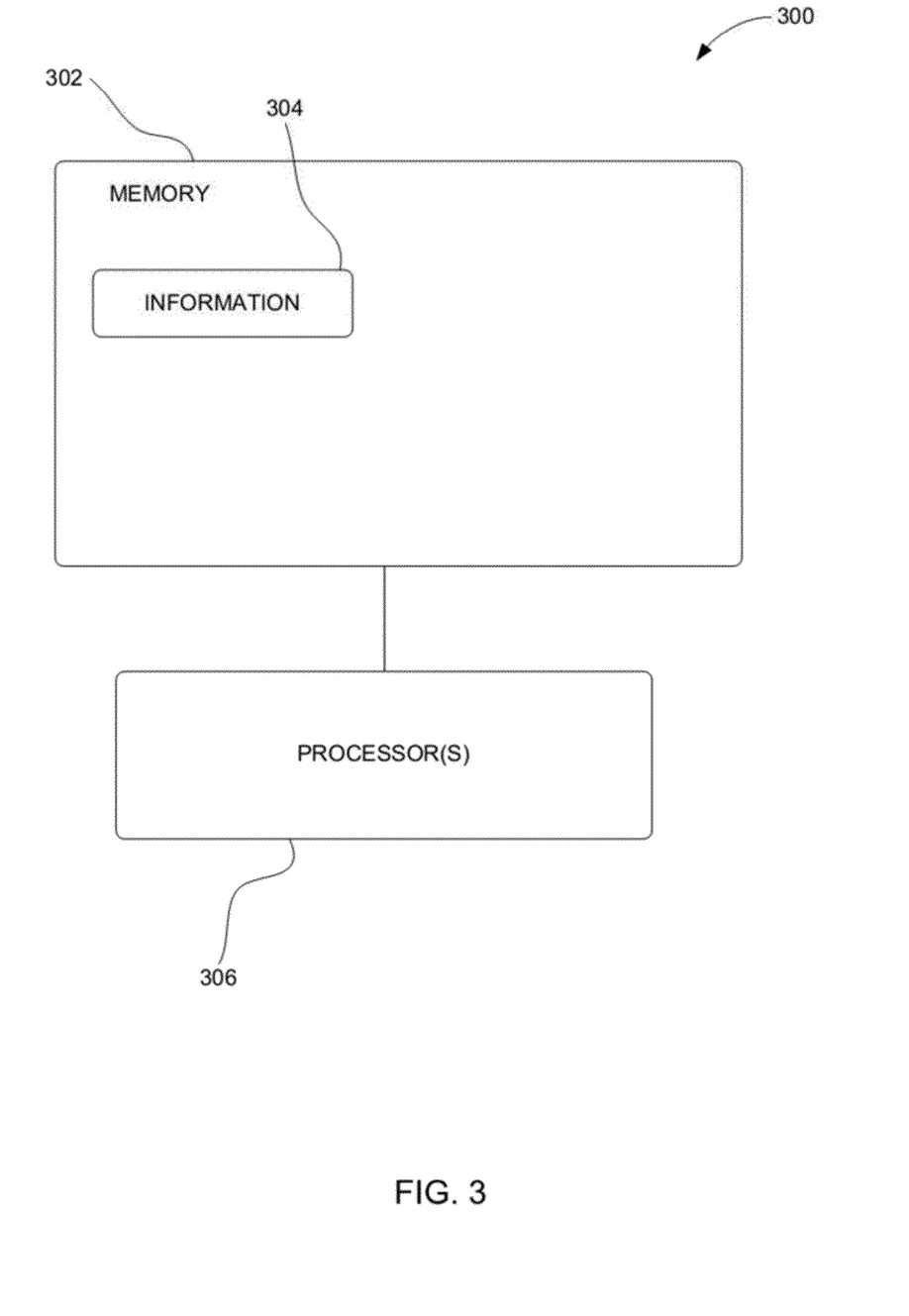
FIG. 3 is a block diagram of an article according to various embodiments of the invention.

FIG. 3 is a block diagram of an article 300 according to various embodiments of the present subject matter. Such embodiments may comprise a computer, a memory system, a magnetic or optical disk, certain other storage device, or any type of electronic device or system. The article 300 may include one or more processor(s) 306 coupled to a machine-accessible medium such as a memory 302 (e.g., a memory including electrical, optical, or electromagnetic elements). The medium may contain associated information 304 (e.g., computer program instructions, data, or both) which, when accessed, results in a machine (e.g., the processor(s) 306) performing the activities described herein.

Figure 4:
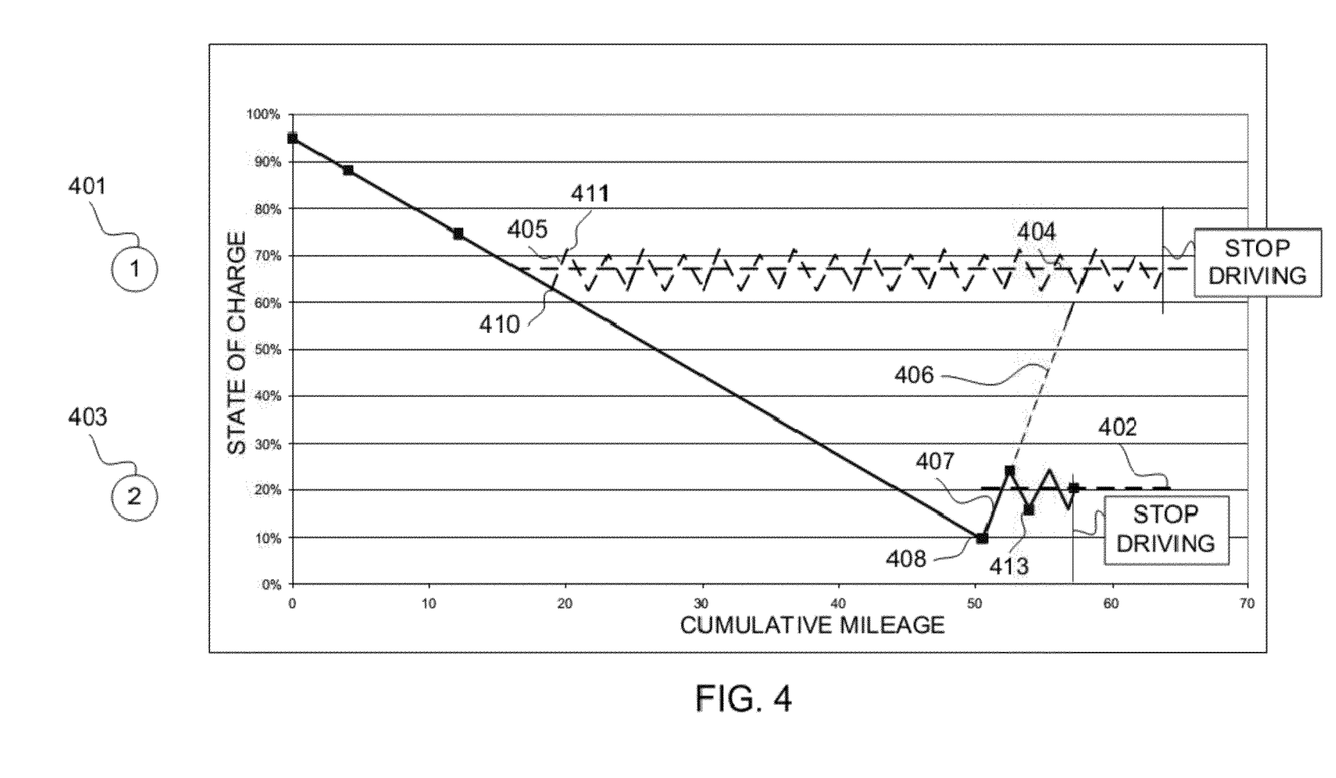
FIG. 4 is a diagram showing state of charge over miles operated, according to an embodiment.

FIG. 4 is a diagram showing state of charge over miles operated, according to an embodiment. The diagram shows a first averaged value 404 and a second averaged value 402. The first averaged value corresponds to a first operational mode 402. The second averaged value corresponds to a second mode such as the second mode 403, but the systems and methods discussed here are not limited to those two modes. These modes may be user selectable as disclosed herein.

In a first mode 401, the system allows the battery to be depleted during normal use of the vehicle until a state of charge circuit determines that the state of charge of the battery has dropped below a specified state of charge 410. The system will start the fuel burning engine to drive a generator to charge the battery up to a second state of charge 411.

The second state of charge 411 could be equal to the first if the system could cycle very fast. In reality, it will be higher than the first state of charge 410. As such the system will start and stop the engine to maintain charge at between the first and second state of charges. An averaged value 404 will be used to determine if the vehicle is maintaining a target value, such as 68% state of charge. The state of charge circuit calculates the average value 404 based on collecting samples of the state of charge of the battery over time. Time used to calculate the averaged value can start at 0 miles or can be reset to start at 411 once that state of charge has been met. Other methods of monitoring the difference between the first and second states of charge are also possible, such as by running the fuel burning engine to maintain a state of charge which is within a specified sigma value between the first state of charge and the second state of charge. Other control algorithms are possible.

In some embodiments, the average charge 404 is the charge that has been determined to be necessary for the vehicle to operate normally in everyday use. A substantial amount of power is kept in reserve to be used for various tasks. For example, the power can be used instantly, such as in a high-load race, maximum power to the wheels race, or it can be a high power requirement over time, such as driving through a hilly valley wherein the vehicle undergoes many changes in elevation.

In some examples, a normal system is a system that can accommodate normal driving behavior as set out by the Environmental Protection Agency's drive cycle or another drive cycle. For example, the average charge is enough to allow for the vehicle to climb hills without have to run solely on energy provided by the fuel burning engine. In one example drive cycle, at least 68% of the full charge of the battery is kept in reserve to be used to power the vehicle in situations that require a lot of power. In further examples, an average battery energy reserve of 50% of state of charge is used in some examples, but other examples are possible. In some examples, the energy reserve is measured by measuring the battery voltage. For example, a battery reserve with a voltage of 50% of the voltage at full battery charge is used.

To maintain such performance, the first mode will maintain the vehicle at an average state of charge 404 which can provide for normal perceived use. The first mode will do this even if the vehicle is not being stressed to a level where a substantial reserve of the average battery energy is required.

But users may want to go a further distances purely on electric power, even if there is a risk that in some conditions the driving may not be "normal". In various embodiments, once the user has driven this far and depleted the battery reserves, it is possible for the fuel burning engine to provide energy that can ultimately propel the vehicle (e.g. at a creeping speed), but which will not provide enough energy to propel the vehicle according to what a user would perceive as normal.

Thus, in the second mode 403, the system allows the voltage to drop to a lower level 408. This level is much further below the average value 404 of the first mode. This mode improves the driving range that is possible using only the battery and not the fuel burning engine. Charging via the fuel burning engine begins after more battery-only miles have been driven. This mode also stores a lower reserve of power, such as an averaged value, in favor of reducing the amount of fuel that is ultimately burned. As such, this mode provides for decreased flexibility in the driving pattern of the vehicle. The vehicle might climb hills less quickly, or accelerate less quickly, but it also burns less fuel. This is preferred by some vehicle users who seek to reduce the amount of fuel burned by the engine 210 as much as possible, such as those who are concerned about the environment.

The second mode can maintain an averaged value state of charge 402. This is lower than the engine-on threshold 410 of the first mode 401. A vehicle operating as such would not run the engine long enough to reach the higher value 411 of the first mode. In this mode, the use might plan to rely on the potential to stop driving and charge the vehicle using an energy source such as a municipal power grid.

However, the system can be configured optionally to charge up to at least the threshold 411 after the lower limit 408 has been reached. This charge up 408 will eventually restore the vehicle to normal operating charge levels, so that the averaged value 404 is maintained. As such, a driver can attempt to make an entire trip on batteries alone, but then can have their engine run to restore the deeply depleted batteries back to a normal state.

There are several opportunities to lower the amount of fuel consumed. A first opportunity is to allow discharge down to the third threshold 408 before an engine is started to charge the battery. A second opportunity is to run the engine to charge up to the second averaged value 402 instead of running the engine to charge up to the first averaged value 404. If this second possibility is elected, the constant fuel burn 406 to get to the first averaged value 404 is avoided. In one option, 408 is lower than 413, which is a state of charge threshold for maintaining 402 when in the second mode and the value 408 has already been reached once. This is a less substantial version of the recovery charge, constant fuel burn 406, and can reduce some fuel consumption.

If a mode is selected in which the averaged value 404 is desired, the present subject matter can allow for a drop to the third threshold value 408 of 10%. This allows for an extra 30 miles of drive before fuel is burnt. This also provides for a much lower state of charge, which in turn can limit the flexibility of use of the vehicle.

The diagram shows that if the user is using the first averaged value 404, they can only drive around 15 miles before fuel is burned. But if they are using the second state of charge 402, they can drive 50 miles before fuel is burned. This second state of charge operating mode allows for users who can potentially not use fuel, if their daily commute distance is less than this distance and does not require them to use the fuel.

The value of the first averaged value 404 and for the second averaged value 402 can be selected based on battery chemistry. For example, an averaged value can be selected based on the optimal charge density for a battery.

Figure 5:
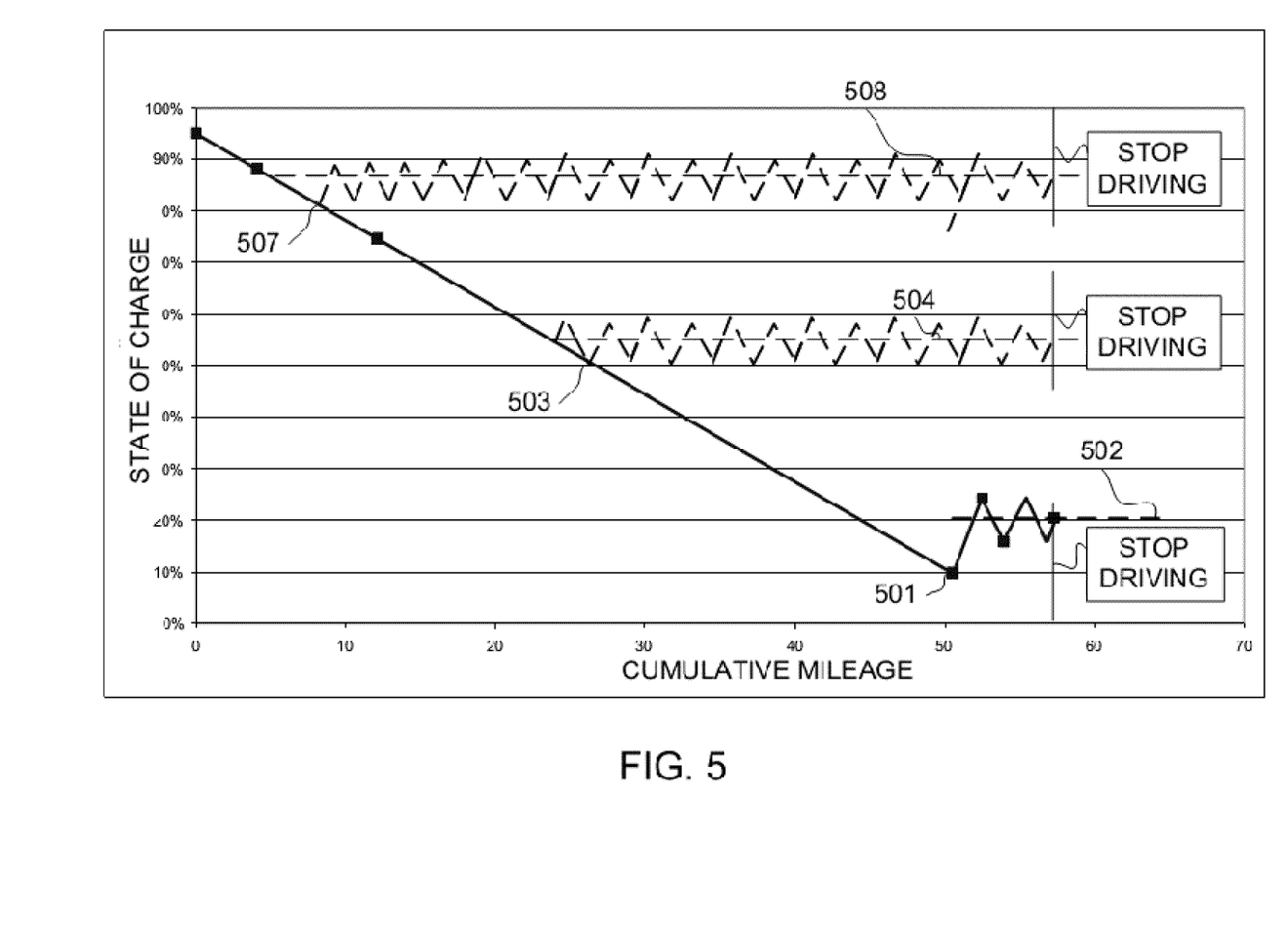
FIG. 5 is a diagram showing state of charge over miles operated, according to an embodiment.

FIG. 5 is a diagram showing state of charge over miles operated, according to an embodiment. In various embodiments, a first operational mode is to allow depletion of state of charge of the battery down to a first state of charge 507 and to provide an engine control signal to maintain a first averaged value 508 that is higher than the first state of charge by controlling the engine to charge the battery. A second operational mode is to allow depletion of the state to charge the battery down to a second state of charge 503 which is lower than the first state of charge 507, and to provide the engine control signal to maintain a second average state 506 of charge that is higher than the second state of charge 507.

If a mode is selected in which the averaged value 502 is desired, the present subject matter can allow for a drop to the threshold value 501 of 10% in the illustration. This allows for an extra 30 miles of drive according to the illustration before fuel is burnt when compared to the second mode which has an averaged value of approximately 50%. This also provides for a much lower state of charge, which in turn can limit the flexibility of use of the vehicle. The graph shows that if the user is using the first averaged value 508, they can only drive around 5 miles before fuel is burned. But if they are using the second state of charge 502, they can drive 50 miles before fuel is burned. This second state of charge operating mode allows for users who can potentially not use fuel, if their daily commute does not require their car to begin to use fuel.

The magnitude of the first averaged value, second averaged value, etc. can be selected based on battery chemistry. For example, an averaged value can be selected based on the optimal charge density for a battery. These values could also be selected to improve calendar life of the vehicle. For example, if the first mode, illustrated as having an averaged value of 88%, damages the calendar life of the batteries, that mode can be selected only after a user is warned of this and acknowledges that this damage will occur.

In various embodiments, a display screen could allow a user to select between "power mode", "normal mode" and "max EV mode". In some embodiments, "power mode" would select an average that would be targeted to reach approximately 70%, and would begin to charge the batter such as soon as required to always maintain at least 70% averaged value. A "normal mode" would operate in a fashion similar to the first mode, but would always maintain at least a 50% averaged value. A "max EV mode" the averaged value would target around 20%. In "max EV mode" charging would not begin until the third state of charge was reached. Mode 401 of FIG. 4 is a normal mode, while mode 403 is a max EV mode that allows deep discharge of the battery before fuel burning is used to power a generator to charge a battery.

Figure 6:
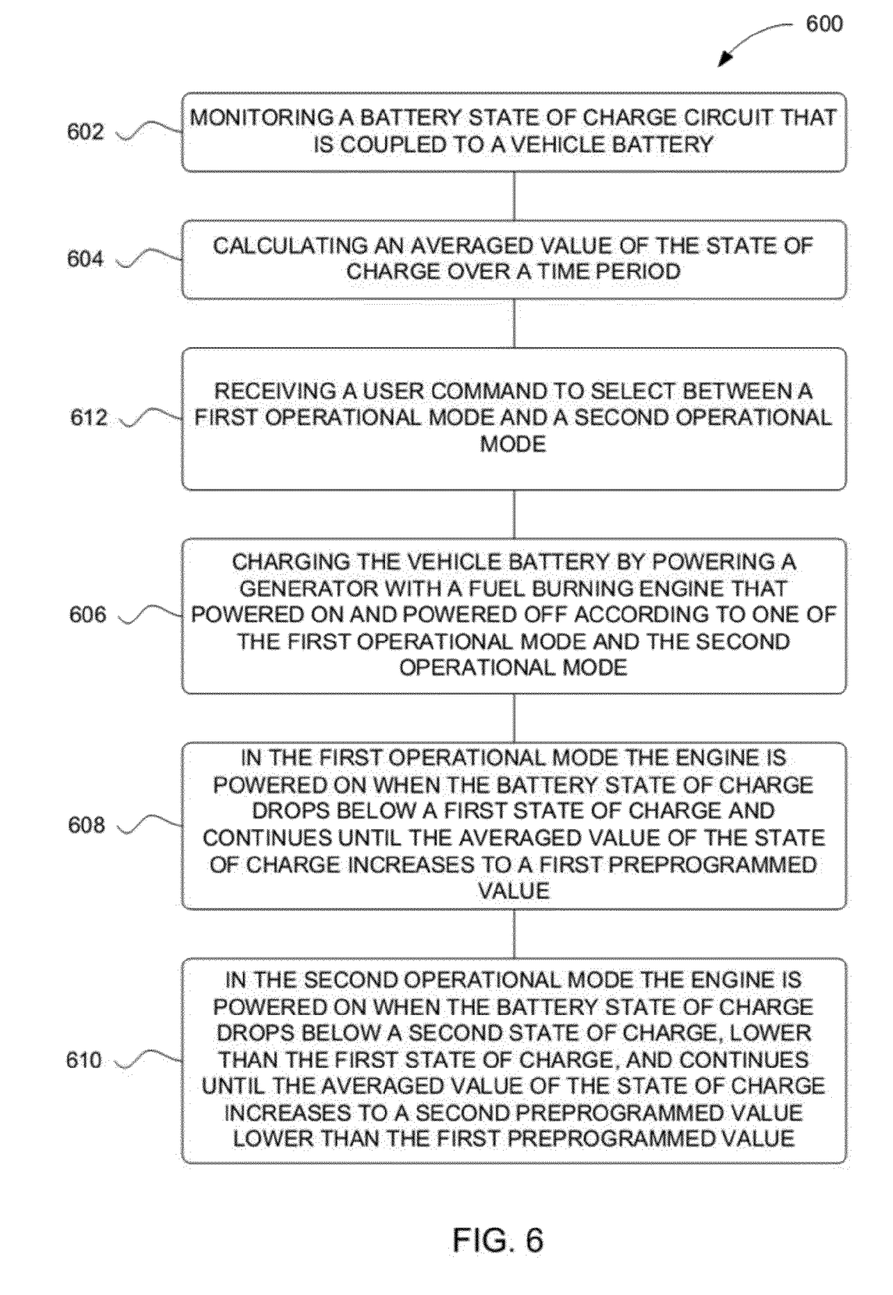
FIG. 6 is a diagram of a method, according to an embodiment.

FIG. 6 is a diagram of a method 600, according to an embodiment. At 602, the embodiment includes monitoring a battery state of charge circuit that is coupled to a vehicle battery. At 604, the method includes calculating an averaged value of the state of charge over a time period. At 606, the method includes charging the vehicle battery by powering a generator with a fuel burning engine that powered on and powered off according to one of a first operational mode and a second operational mode. In the first operational mode, at 608, the engine is powered on when the battery state of charge drops below a first state of charge and continues until the averaged value of the state of charge increases to a first preprogrammed value. In the second operational mode at 610 the engine is powered on when the battery state of charge drops below a second state of charge, lower than the first state of charge, and continues until the averaged value of the state of charge increases to a second preprogrammed value lower than the first preprogrammed value. At 612, the method includes receiving a user command to select between the first operational mode and the second operational mode.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A system integrated into a vehicle, the system comprising:
   a motor, said motor providing propulsion power to said vehicle;
   a battery coupled to said motor and providing energy to said motor;
   a generator system, said generator system comprising an engine, said engine burning fuel selected from the group consisting of fossil fuels, synthetic fuels and bio-fuels, wherein said generator system provides charging energy for said battery;

an engine control circuit to power on and power off said engine, wherein said engine control circuit powers on said engine when it receives an engine control signal;

a state of charge circuit configured to monitor a battery state of charge and preprogrammed to provide said engine control signal in accordance with an operational mode, wherein said operational mode is selected from at least a first operational mode and a second operational mode, and wherein the state of charge circuit in said first operational mode provides said engine control signal when said battery state of charge falls below a first state of charge and until said battery state of charge reaches a second state of charge, wherein said second state of charge is higher than said first state of charge, and the state of charge circuit in said second operational mode provides said engine control signal when said battery state of charge fails below a third state of charge and until said battery state of charge reaches said second state of charge, wherein said third state of charge is lower than both said first state of charge and said second state of charge;

a user interface coupled to said state of charge circuit and configured to receive a user command selecting said operational mode for the state of charge circuit, wherein said operational mode is selected from at least said first operational mode and said second operational mode; and at least one operational mode indicator, wherein said operational mode selected via said user interface is indicated by said at least one operational mode indicator.

2. The system of claim 1, wherein after said third state of charge has been reached once the state of charge circuit in said second operational mode provides said engine control signal when said battery state of charge falls below said first state of charge and until said battery state of charge reaches said second state of charge.

3. The system of claim 1, wherein said first state of charge is approximately 50% of a full state of charge.

4. The system of claim 2, wherein said second state of charge is approximately 70% of said full state of charge.

5. The system of claim 1, wherein said third state of charge is approximately 20% of a full state of charge.

6. The system of claim 1, wherein said third state of charge is approximately 10% of a full state of charge.

7. The system of claim 1, wherein said an average of said first state of charge and said second state of charge is preset at a level of at least 68% of a full state of charge.

8. The system of claim 1, wherein said an average of said first state of charge and said second state of charge is preset at a level of at least 50% of a full state of charge.

9. The system of claim 1, wherein said an average of said third state of charge and said second state of charge is preset at a level of at least 20% of a full state of charge.

10. The system of claim 1, wherein said user interface is comprised of a touch screen and wherein said user command is received via a touch registered on said touch screen.

11. The system of claim 1, wherein said at least one operational mode indicator is comprised of at least one light.

12. The system of claim 1, wherein said user interface is comprised of a touch screen, and wherein said operational mode selected via said user interface is indicated by a message on said touch screen.

13. The system of claim 1, wherein said engine of said generator system is mechanically coupled to a generator.

14. The system of claim 1, wherein a generator is integrated into said engine of said generator system.

15. A method of controlling charging of a battery, wherein the battery is within a vehicle, wherein the vehicle utilizes a motor for propulsive power, and wherein the battery provides energy to the motor, the method comprising the steps of:

providing a user interface;

configuring an operational mode of an on-board generator system in response to a user selection input via said user interface, wherein said operational mode is selected from at least a first operational mode and a second operational mode;

monitoring a current battery state of charge; and charging said battery using said on-board generator system, wherein said on-board generator system is comprised of an engine, said engine burning fuel selected from the group consisting of fossil fuels, synthetic fuels and bio-fuels, and wherein said step of charging said battery further comprises the steps of powering on and powering off said engine in accordance with said operational mode, wherein in said first operational mode said engine is powered on when said current battery state of charge falls below a first state of charge and powered off when said current battery state of charge reaches a second state of charge, wherein said second state of charge is higher than said first state of charge, and wherein in said second operational mode said engine is powered on when said current battery state of charge falls below a third state of charge and powered off when said current battery state of charge reaches said second state of charge, wherein said third state of charge is lower than both said first state of charge and said second state of charge.

16. The method of claim 15, wherein in said second operational mode after said third state of charge has been reached once said engine is powered on when said current battery state of charge falls below said first state of charge and powered off when said current battery state of charge reaches said second state of charge.

* * * * *